United States Patent
Huber

(10) Patent No.: US 7,784,968 B2
(45) Date of Patent: Aug. 31, 2010

(54) SLIDE CONTROLLER FOR AN AUDIO MIXER

(75) Inventor: Robert Huber, Unterengstringen (CH)

(73) Assignee: Studer Professional Audio Systems GmbH, Regensdorf (CH)

( * ) Notice: Subject to any disclaimer, the term of this patent is extended or adjusted under 35 U.S.C. 154(b) by 220 days.

(21) Appl. No.: 12/048,479

(22) Filed: Mar. 14, 2008

(65) Prior Publication Data

US 2008/0310142 A1 Dec. 18, 2008

Related U.S. Application Data

(63) Continuation-in-part of application No. 10/568,791, filed on Jul. 12, 2007, now Pat. No. 7,682,044.

(30) Foreign Application Priority Data

Aug. 21, 2003 (CH) .................................. 1428/03
Aug. 11, 2004 (WO) ............... PCT/CH2004/000500

(51) Int. Cl.
*F21V 33/00* (2006.01)
(52) U.S. Cl. .......................... 362/253; 362/85; 362/551
(58) Field of Classification Search ............. 362/85–87, 362/295, 394, 231, 551, 552, 555, 582, 249.12, 362/249.13, 253; 381/98, 58
See application file for complete search history.

(56) References Cited

U.S. PATENT DOCUMENTS

| 4,130,080 A | | 12/1978 | Lotz |
| 4,464,781 A | * | 8/1984 | Kaneko et al. ................ 381/12 |
| 4,504,818 A | | 3/1985 | Okuya |
| 4,646,206 A | * | 2/1987 | Bauer et al. ................. 362/552 |
| 5,805,146 A | * | 9/1998 | Jaeger et al. ................ 345/172 |

FOREIGN PATENT DOCUMENTS

| DE | 33 22 414 A1 | 10/1983 |
| DE | 34 11 302 A1 | 10/1985 |
| WO | WO 98/28760 A2 | 7/1998 |

OTHER PUBLICATIONS

PCT International Search Report dated Jun. 23, 2005 for PCT Patent Application No. PCT/CH2004/000500 (2 pages).

* cited by examiner

*Primary Examiner*—Bao Q Truong

(57) ABSTRACT

A controller or adjustment device may adjust a value of a parameter for different functions. The adjustment device may include actuators, which may be associated with one or more functions. A light source in proximity to the adjustment device may identify the function of the device. Mixers and filters may automatically modify the hue and/or value of the color based on the selected function. A different color light may be used to identify different functions of the adjustment device.

22 Claims, 6 Drawing Sheets

SLIDE CONTROLLER FOR AN AUDIO MIXER

PRIORITY CLAIM

This application is a continuation-in-part of U.S. application Ser. No. 10/568,791, filed Feb. 17, 2006 (with a 371(c) date of Jul. 12, 2007), which claims priority to PCT Application Number PCT/CH2004/000500, filed Aug. 11, 2004, which claims priority to Switzerland Application Number CH 1428/03, filed Aug. 21, 2003, each of which is incorporated by reference.

BACKGROUND OF THE INVENTION

1. Technical Field

This application relates to an adjustment device, such as a slide controller, in which a function controlled by the adjustment device is identified.

2. Related Art

An audio mixer may include a variety of adjustment devices for performing various functions or adjusting audio parameters. Each adjustment device may adjust different functions or different parameters. An indicator for each adjustment device may select or identify a particular function or audio parameter that may be modified. An operator may remember the function or the parameter that the adjustment device controls in an audio mixer rather than referencing an indicator for each adjustment device. However, it may be difficult to remember the functions associated with a large number of adjustment devices, requiring frequent references to the indicator.

SUMMARY

A controller or adjustment device may adjust a value of a parameter for different functions. The adjustment device may include actuators, which may be associated with one or more functions. A light source in proximity to the adjustment device may identify the function of the device. Mixers and filters may automatically modify the hue and/or value of the color based on the selected function. A different color light may be used to identify different functions of the adjustment device.

In some systems, the adjustment device may include a slider on an audio mixer. The slider may adjust values for a variety of functions. The adjustment device may include an opening by which the slider may be adjusted. An illuminating element may be located adjacent the opening to provide light through the opening. The illuminating element may display light of different colors with each color corresponding with a different function. The color of light displayed in an opening of the slide may indicate the particular function of that slide.

Other systems, methods, features, and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

An adjustment device may modify a variety of parameters or serve various functions. The functions or parameters modified by the adjustment device may be identified by a light source that is adjacent the adjustment device. The lighting color may correspond to a particular parameter or function. When the parameter or function is changed, the transmitted color may also change to correspond with the selected parameter or function. The adjustment device may include a slide controller with light being displayed in the opening through which the slider moves.

Figure 1:
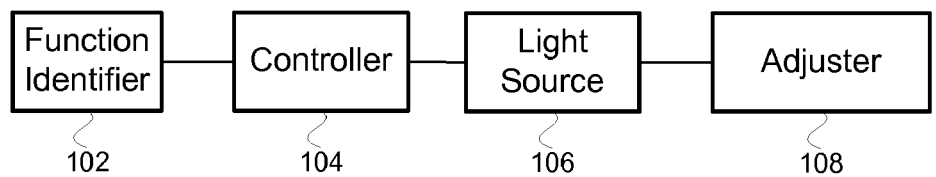
FIG. 1 is an adjuster identification system.

FIG. 1 is an adjuster identification system. The adjuster identification system may include a function identifier 102, a controller 104, a light source 106 and an adjuster 108. The system may be a part of an audio mixer, such as the audio mixer illustrated in FIG. 5. Alternatively, the system may be used in an operator controlled system in which an operator adjusts parameters with an adjustment device. The parameters that may be adjusted may also be referred to as functions.

The adjuster (or adjustment device) 108 may include a slide, slider, knob, button, and/or other controller that adjusts a parameter. The adjuster 108 may allow an operator to modify a parameter/function or multiple parameters/functions. In an audio mixer, the adjuster 108 may modify audio parameters, such as volume, treble, bass, or fade. A single adjuster 108 may be associated with several functions or parameters. The function identifier 102 may indicate the function or parameter that the adjuster 108 controls. The function identifier 102 may also allow an operator to select or change the function associated with the adjuster 108. The operator may refer to the function identifier 102 to determine the parameter or function associated with the adjuster 108.

The function identifier 102 may communicate with the controller 104. The controller 104 may receive a selection of a function from an operator and based on that selection, the controller 104 may provide instructions for controlling the adjuster 108. The controller may communicate with the light source 106. The light source 106 may comprise a multi-color light emitting diode (LED), organic light emitting diode (OLED), solid state lighting (SSL), incandescent bulb, or other electric lamps. The light source 106 may identify the function for the adjuster 108. The light source 106 may generate light of different colors for different functions received from the controller 104 or may combine or filter light to transmit a different color. For example, the light source 106 may provide a three-color light (red, green, and blue) or four-color light (red, green, blue, and black), which may be filtered or combined to generate different colors.

The function identifier 102 may include a reference or legend that associates functions for the adjuster 108 with colors. The color may be displayed at the adjuster 108 from the light source 106 based on the identified function. In one example, a blue color may be associated with volume and a red color may be associated with bass and the function identifier 102 may indicate the color matching as well as allow the operator to select volume or bass as the function for the adjuster 108. A selection of volume to be adjusted by the adjuster 108 results in a blue colored light being displayed at the adjuster 108 to indicate that volume is the function that is adjusted by the adjuster 108.

Figure 2:
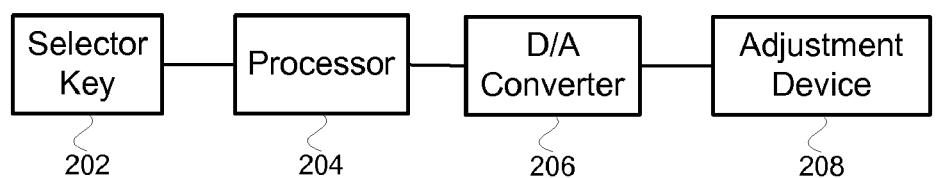
FIG. 2 is an adjustment device selection system.

FIG. 2 is an alternative adjustment device selection system. The adjustment device selection system may include a selector key 202, a processor 204, a digital/analog (DA) converter 206, and an adjustment device 208. The adjustment device 208 may comprise the adjuster 108 or a mechanism allowing an operator to adjust a parameter or function. That parameter or function may be selected by the selector key 202. The selector key 202 may be a series of buttons or labels that identify functions which may be associated with the adjustment device 208. A selection at the selector key 202 may be received by the processor 204 which provides a signal indicating the selection to the adjustment device 208. The signal from the processor 204 may be a digital or analog signal that may be converted by the DA converter 206 for receipt by the adjustment device 208. The adjustment device 208 may include a light source, such as the light source 106, for displaying an indication of the function selected with the selector key 202.

Figure 3:
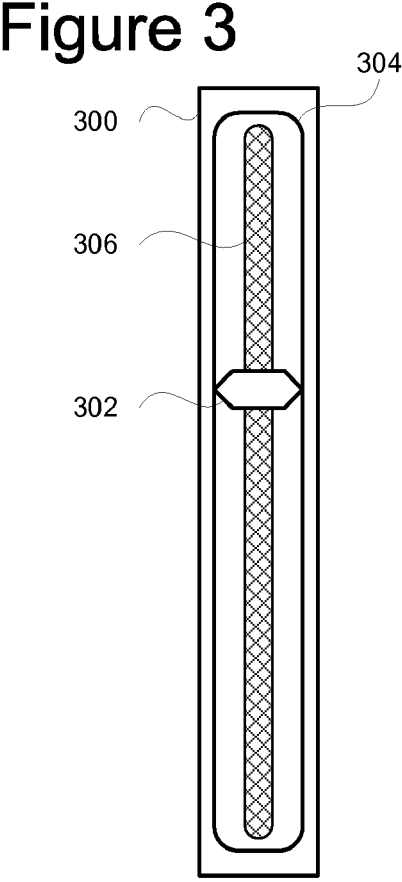
FIG. 3 is an exemplary slide.

FIG. 3 is an exemplary slide 300. The slide 300 may be the adjuster 108 or the adjustment device 208. The slider 302 may be adjustable by the operator by moving along a linear track 304. The slider's position on the track 304 may reflect a value for a parameter. In one example, when the function/parameter that is adjustable by the slide 300 is volume, then the vertical position of the slider 302 corresponds with a volume level, where a position near a first end represents a higher volume and a position near a second end represents a lower volume. The track 304 may also be an opening through which the slider 302 moves. The light source 306 may display light along the opening/track 304 of the slide 300. The light source 306 may display different colors of light that correspond with different functions or parameters that are adjustable with the slide 300.

Figure 4:
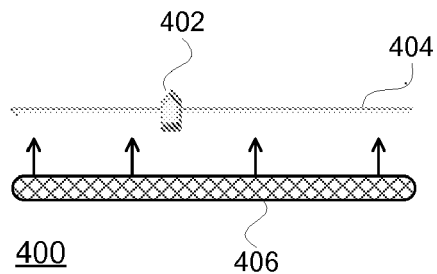
FIG. 4 is an alternative view of an exemplary slide.

FIG. 4 is an alternative view of an exemplary slide 400. The slide 400 may include a slider 402, a track 404, and a light source 406. The slide 400 may be the adjuster 108 or the adjustment device 208. The slider 402 may be slide along the track 404. A light source 406 positioned below the slider 402 for illumination of the track 404. The light source 406 may transmit light that is visible through the track 404. The track 404 may have an opening that allows the slider 402 to move and the light source 406 may display light through the opening.

Figure 5:
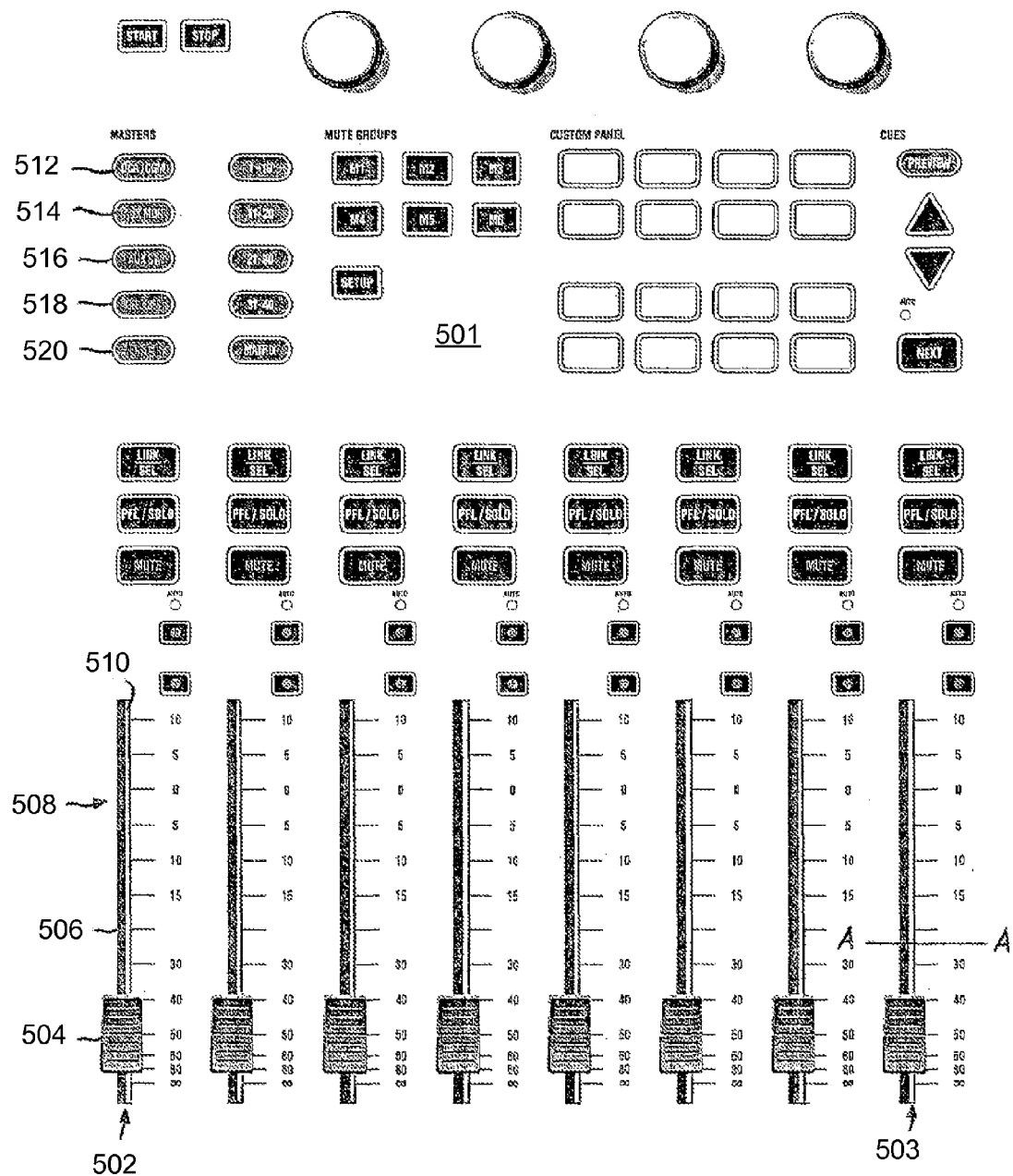
FIG. 5 is an audio mixer with slide controllers.

FIG. 5 is an audio mixer 500 with adjusters or adjustment devices. The audio mixer 500 may be an electric device for combining, routing, or modifying the dynamics of audio signals. The audio mixer 500 may include slide controllers for adjusting the equalization of an audio signal by attenuating or increasing a range of frequencies. Each channel of the mixer 500 may be controlled by a slide or rotatable controller.

FIG. 5 illustrates a front plate 501 of the audio mixer 500 that includes various controllers, buttons, knobs and sliders for adjusting audio parameters. In particular, a number of slide controllers are illustrated, such as slide controllers 502 and 503 that may be used for controlling audio parameters of particular channels. The slide controller 503 is further illustrated below in FIG. 6. The slide controller 502 includes a slider 504, which may comprise a knob or key that is shifted along a slot shaped opening 506 on the front plate 501 of the audio mixer 500. The slider 502 may move along the slot shaped opening 506 along a linear path 508 that may be limited by the length of the opening 506. An illuminating element 510 may be provided in or adjacent the opening 506. In one system, the illuminating element 510 may be located beneath the opening 506 such that light from the illuminating element 510 may shine through the opening 506 as in FIG. 4.

The illuminating element 510 may transmit light of different colors corresponding to different audio parameters or different functions. The selector keys 512-520 may correspond with different parameters or functions that are selected by the user and may be an example of the function identifier 102 or the selector key 202. Each of the selector keys 512-520 may associate with at least one of the slide controllers, such as the slide controllers 502, 503. The slider controls may modify one or several audio signals, or influence or adjust at least one parameter of several or one audio signals. Each of the selector keys 512-520 may be illuminated with a different color. When a key is selected the corresponding color or gradation of color may automatically change to reflect a selected function. The colors may transmitted by using filters to remove a particular color, or by combining colors to generate a different color. Alternatively, a value, gradation, hue, brightness, or chroma of the key may be adjusted or modified for different functions.

Figure 6:
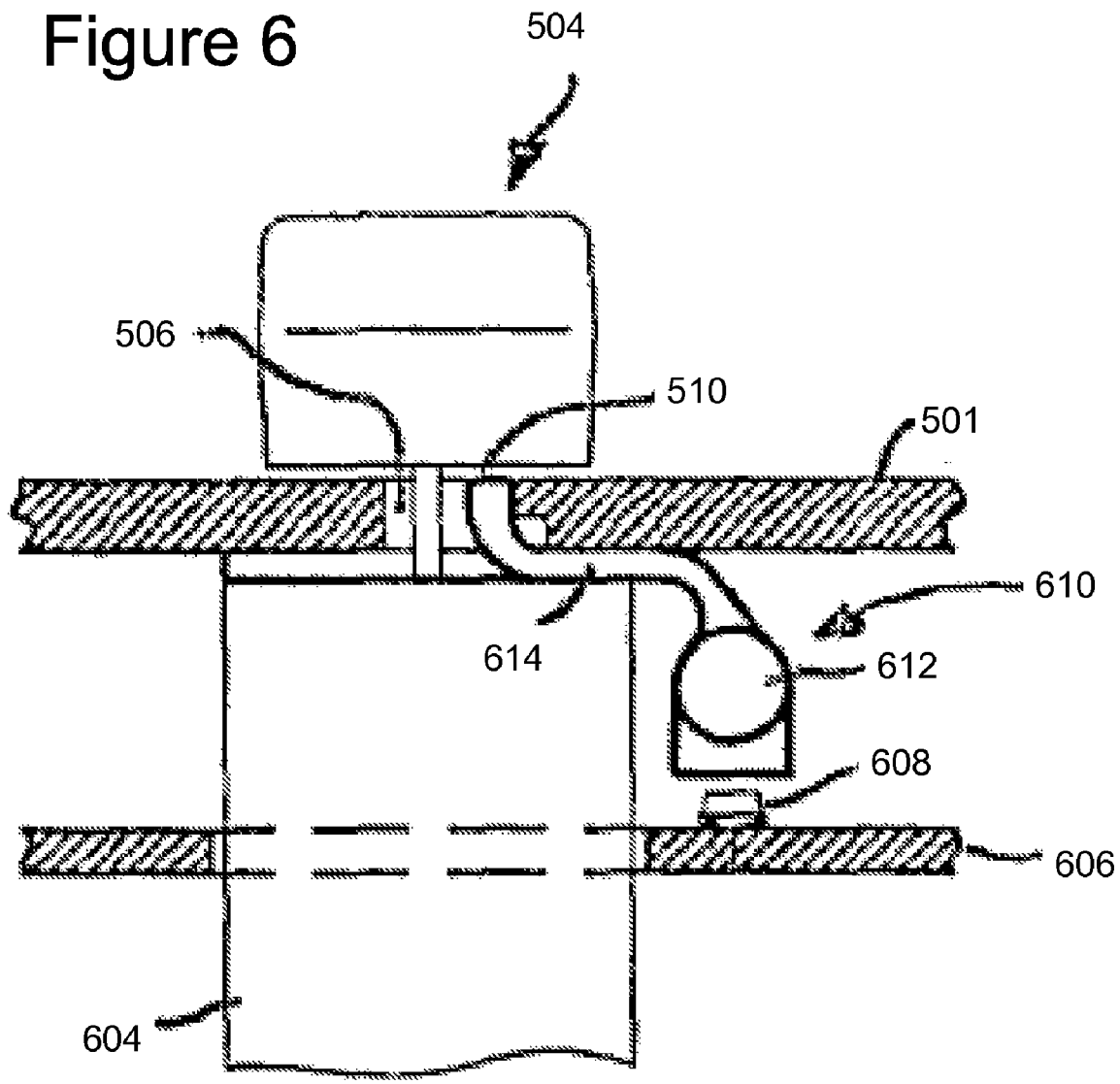
FIG. 6 is a view of a controller along a line A-A from FIG. 5.

FIG. 6 is a view of a controller along a line A-A in FIG. 5. The front plate 501 of the audio mixer 500 is shown with the opening 506 and the illuminating element 510. The slider 504 may move along the opening 506. An actuator element 604 may be coupled with the slider 504 and comprise a potentiometer. A light source 608 may be a multi-color light emitting diode that is arranged on a printed circuit board 606. A light conductor 610 may include a main connector part 612 and a bent conductor 614. The light conductor 610 may be disposed on the front plate 501, or it may be disposed on the printed circuit board 606. The light generated from the light source 608 may pass through the main connector part 612 and the bent conductor 614. The light conductor 610 may distribute the light in a longitudinal direction along the opening 510. Light distribution may be improved through coatings or other measures for the light conductor 610. The light conductor 610 may be hollow or filled or it may also comprise a bundle of light-conducting fibers. Generated light may emerge across the length of the opening 510 and may include a strip-shaped end face such as the illuminating element 510, which may be located along a movement path of the slider 504. The strip-shaped end face or the illuminating element 510 may be connected with the main connector part 612 through the bent conductor 614. The main connector part 612 may receive and display the light parallel with the opening. The distribution of the light in the longitudinal direction may be implemented at a predetermined distance from the opening 510 in the main connector part 612. The light may change laterally from the main connector part 612 into the bent conductor 614, which may open into the illuminating element 510.

Figure 7:
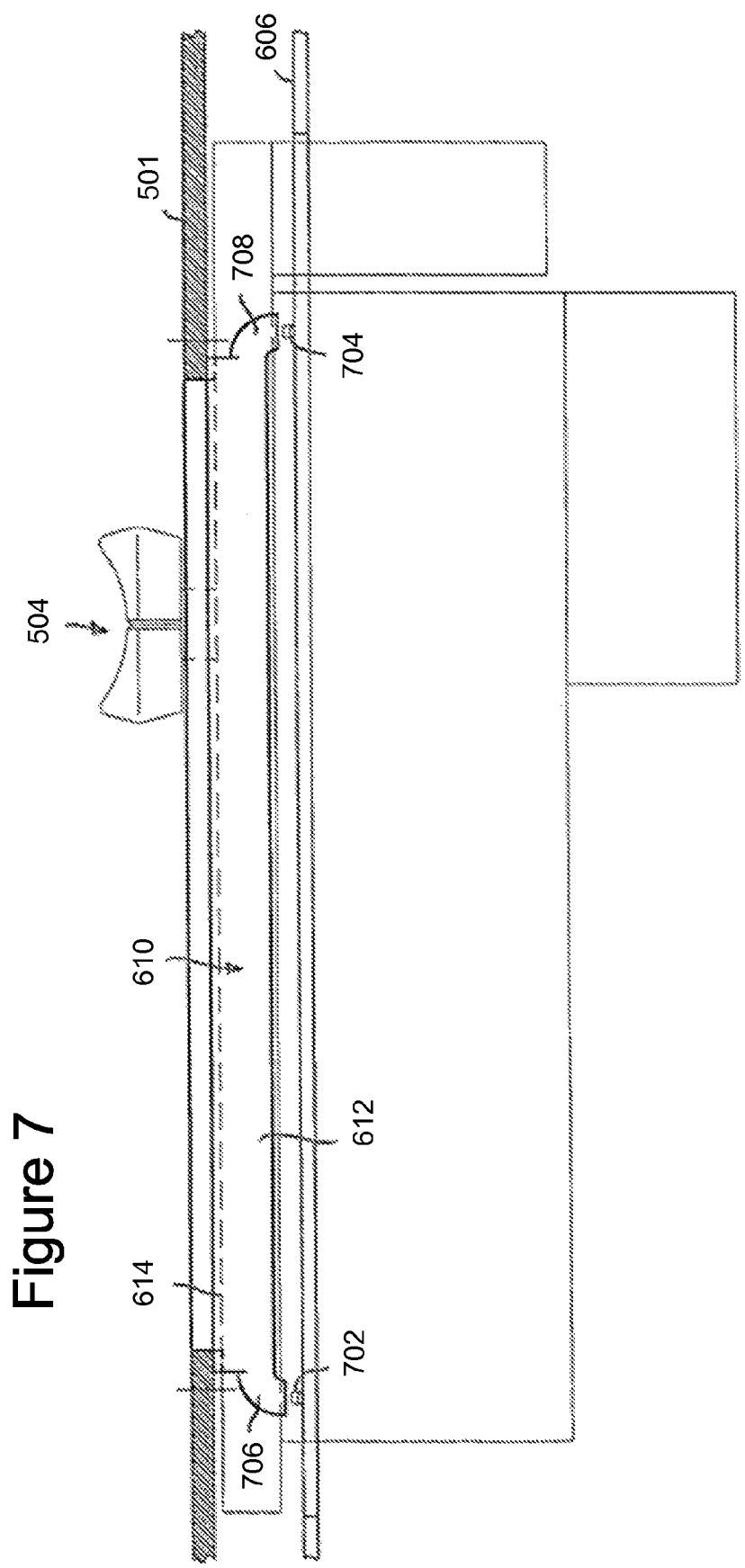
FIG. 7 is an exemplary slide controller.

FIG. 7 is an alternative view of a slide controller. The slider 504 is shown on the front plate 501. The light conductor 610 includes the main connector part 612 and the bent conductor 614. Two light sources 702, 704 are disposed on the printed circuit board 606. The light sources 702, 704 provide light through bent light shafts 706, 708, respectively. The bent conductor 614 may include the bent light shafts 706, 708 that reflect light. In alternative systems, fewer or more light sources may be provided and the light may be displayed differently. The light may pass from the light source 702 and be deflected or reflected by the light shaft 706 and the bent conductor 614 into the main connector part 612. Likewise, light may pass from the light source 704 and be deflected or reflected by the light shaft 708 and the bent conductor 614 into the main connector part 612. The main connector part 612 of the light conductor 610 may be illuminated by the light sources 702, 706. The illumination of the light conductor 610 may be visible through the opening in which the slider 504 may move.

Figure 8:
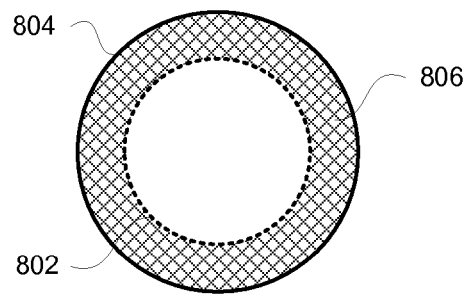
FIG. 8 is an alternative adjustment device.

FIG. 8 is an alternative adjustment device 800. The alternative adjustment device 800 comprises a knob 802. The sliders discussed above are adjusted by a slide or lateral movement, while the knob 802 may be adjusted through a rotatable motion. A parameter may be increased with a clockwise rotation of the knob 802 and the parameter may be decreased by a counter-clockwise rotation of the knob 802. The knob 802 may be disposed in an opening 804. In one system, the opening 804 is in the front plate 501 of the audio mixer 500. The opening 804 allows the knob 802 to be electrically coupled with a processor or controller that monitors or receives any adjustments to the knob 802. Adjacent the opening 804 may be a light source 806. The light source 806 may be an illuminating element in proximity to the knob 802 that illuminates the opening 804. The light source 806 may generate light that is displayed around the exterior and/or through a translucent portion of the knob 802. The color of the light from the light source 806 may correspond with a parameter or function that the knob 802 may adjust.

Figure 9:
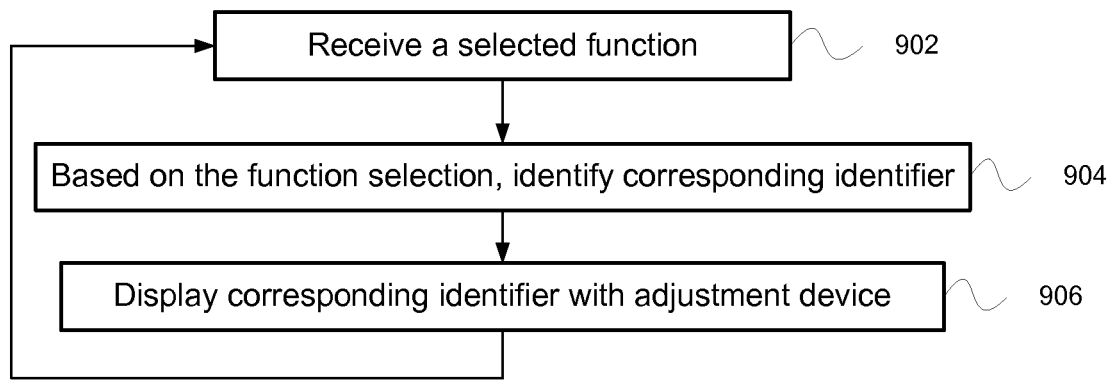
FIG. 9 is an identification of a function with an adjustment device.

FIG. 9 shows identification of a function with an adjustment device. In block 902, a selected function is received. The selected function may correspond with a parameter that is adjusted. The parameter may be an audio parameter that is adjusted by an audio mixer, such as the audio mixer 500. The selected function may be received from the function identifier 102 or the selector key 202, such as the selector keys 512-520. An operator may select a particular function or parameter that is received by the system in block 902. In block 904, a corresponding identifier may be determined based on the function selected by a selector key. The identifier may then be displayed adjacent the adjustment device that corresponds with the selected function as in block 906. In one system, the identifier comprises a color of light that is displayed at the adjustment device. The adjustment device may then be used to adjust or perform the selected function until a different selected function is received in block 902.

Figure 10:
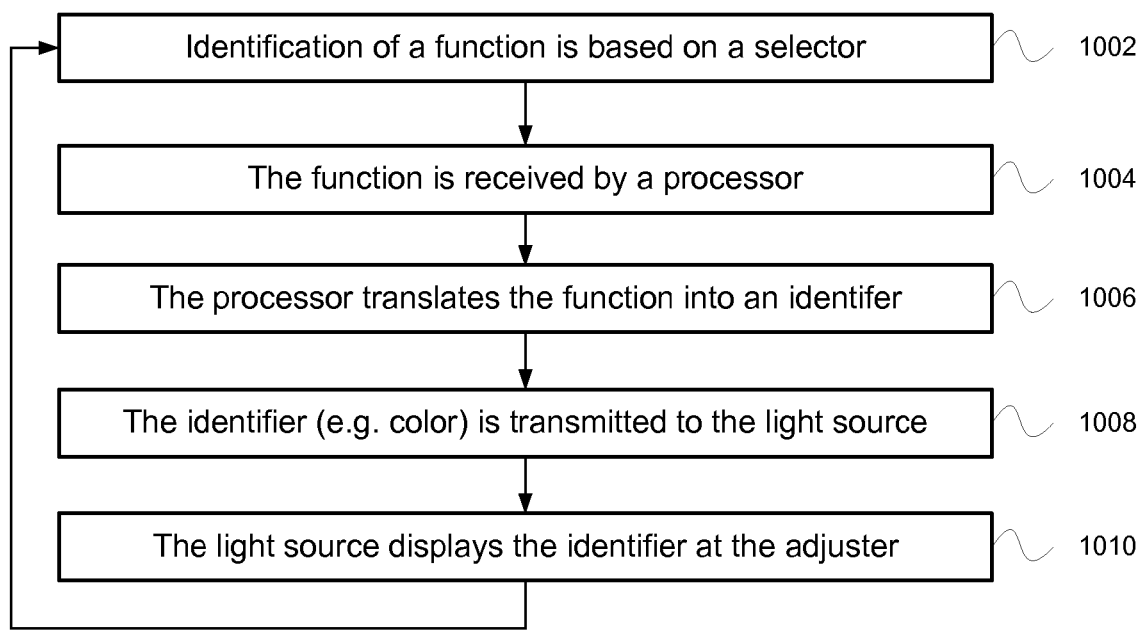
FIG. 10 is an alternative identification of a function with an adjustment device.

FIG. 10 shows an alternative identification of a function. In block 1002, a function is identified based on a selector. A processor, such as the processor 204 or the controller 104, may receive the selected function in block 1004. The processor translates the selected function into an identifier in block 1006. The identifier may then be transmitted to a light source as in block 1008. The light source may display the identifier at the adjustment device 1010. The identifier may be a color of light that is emitted from the light source and displayed adjacent an adjustment device. The colored light corresponding to the selected function is displayed until a different function is selected in block 1002. The color of light may correspond with the selected function. The selector may display each function with an associated color, such that when one of the functions was selected, the adjustment device is displayed with the corresponding color of light. The adjustment device may be a slide controller or knob in which the colored light is displayed from an opening.

In one system, a slider moves along a track and the light shines from below the track. The illumination of the opening in the track may be visible along the track except where the slider is located. The slider may block the light which may otherwise be uniform along the opening. The light may be visible from any position. An illuminating element may be provided longitudinally next to or in the slot-shaped opening, in which the slider may be shifted along a limited path in the front plate. The illuminating element may extend parallel to the opening along the length of the opening. The illuminating element may appear as a luminous elongate strip when looking at a front plate including the slide controller. The luminous strip may be continuous or it may be divided into sections. The illuminating element may include a light conductor and a light source, which may emit multi-colored light. A multi-color light emitting diode is may be provided as a light source. The illuminating element may be connected with a selector key or a selector key field through a light conductor and a light source. The selector key or selector key field may allow a desired function or parameter to be searched for and selected. The selector key for selecting at least one function may be connected with the light source for the illuminating element such that the light source is controlled. A certain color for the light from the light source may be associated with the respective function or the respective parameter. One selector key each may be provided for each function and one independent color for the light from the illuminating element may be associated with each function.

The system and process described may be encoded in a signal bearing medium, a computer readable medium such as a memory, programmed within a device such as one or more integrated circuits, one or more processors or processed by a controller or a computer. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A system for identifying and displaying a function comprising:
    a selector key that receives an input;
    a processor in communication with the selector key that receives the input and identifies the function associated with the input at the selector key;
    a light source in communication with the processor that identifies the function by adjusting a light color from the light source; and
    an adjustment device in communication with the light source that displays the light color in an opening of the adjustment device, where the adjustment device is associated with the function.

2. The system of claim 1 where the adjustment device comprises a slider.

3. The system of claim 2 where the opening of the adjustment device comprises a track that the slider moves along.

4. The system of claim 1 where the adjustment device comprises a knob.

5. The system of claim 1 where the light source comprises a light emitting diode.

6. The system of claim 1 where the light source is arranged on a printed circuit board.

7. The system of claim 1 where the light source is controlled such that a predetermined color for the light from the light source is associated with the identified function.

8. A slide controller comprising:
    a slider that adjusts a value;
    a slot in which the slider may be shifted along through an opening; and
    an illuminating element that extends along the opening, where the illuminating element identifies the value that is adjusted with the slider.

9. The slide controller of claim 8 where the illuminating element displays multi-colored light.

10. The slide controller of claim 9 where the value is identified based on a color of light in the illuminating element.

11. The slide controller of claim 10 where a first color is displayed for a first value and a second color is displayed for a second value.

12. The slide controller of claim 8 where the illuminating element comprises a luminous strip.

13. The slide controller of claim 12 where the illuminating element is connected to a light conductor and is connected to a light source.

14. The slide controller of claim 8 further comprising: a front plate coupled with the slide controller, where the opening is formed in the front plate.

15. The slide controller of claim 8 further comprising:
    a selector key that determines the value that is adjusted with the slider.

16. The slide controller of claim 15 where the value that is adjusted by the slider is on a selection of the selector key.

17. The slide controller of claim 8 where the slide controller is part of an audio mixer and the value that is adjusted is an audio value.

18. A method for identifying a function comprising:
    receiving an input from a function selector;
    identifying a function based on the input from the function selector;
    associating the function with an adjuster that performs the function by receiving adjustments for the function; and
    displaying an identification of the function adjacent the adjuster.

19. The method of claim 18 where the displaying the identification of the function comprises displaying a light with a color that corresponds with the function.

20. The method of claim 19 where the light is displayed through an opening for the adjuster.

21. The method of claim 20 where the adjuster comprises a slider and the opening for the adjuster is a track on which the slider moves.

22. The method of claim 19 where a first color is displayed for a first function and a second color is displayed for a second function.

* * * * *

UNITED STATES PATENT AND TRADEMARK OFFICE
CERTIFICATE OF CORRECTION

PATENT NO. : 7,784,968 B2  
APPLICATION NO. : 12/048479  
DATED : August 31, 2010  
INVENTOR(S) : Robert Huber Page 1 of 1

It is certified that error appears in the above-identified patent and that said Letters Patent is hereby corrected as shown below:

On the Title Page and at column 1, the Title should be changed to --SLIDE CONTROLLER FOR AN AUDIO-MIXER--

At column 2, line 56, change "The controller may communicate" to --The controller 104 may communicate--

At column 3, line 49, change "The slider 402 may be slide" to --The slider 402 may slide--

At column 3, line 50, change "A light source 406 positioned" to --A light source 406 may be positioned--

At column 4, line 19, change "The slider controls may modify" to --The slide controllers may modify--

At column 4, line 53, change "with the opening." to --with the opening 510.--

At column 6, line 13, change "light emitting diode is may be" to --light emitting diode may be--

In Claim 16, column 8, line 19, change "the slider is on a selection" to --the slider is based on a selection--

Signed and Sealed this  
Tenth Day of July, 2012

David J. Kappos  
*Director of the United States Patent and Trademark Office*

(12) EX PARTE REEXAMINATION CERTIFICATE (9934th)
United States Patent
Huber

(10) Number: US 7,784,968 C1
(45) Certificate Issued: Nov. 12, 2013

(54) SLIDE CONTROLLER FOR AN AUDIO-MIXER

(75) Inventor: Robert Huber, Unterengstringen (CH)

(73) Assignee: Studer Professional Audio Systems GmbH, Regensdorf (CH)

Reexamination Request:
No. 90/012,134, Feb. 7, 2012

Reexamination Certificate for:
Patent No.: 7,784,968
Issued: Aug. 31, 2010
Appl. No.: 12/048,479
Filed: Mar. 14, 2008

Related U.S. Application Data

(63) Continuation-in-part of application No. 10/568,791, filed on Jul. 12, 2007, now Pat. No. 7,682,044.

(30) Foreign Application Priority Data

Aug. 21, 2003 (CH) .................... 1428/03
Aug. 11, 2004 (WO) .............. PCT/CH2004/000500

(51) Int. Cl.
*G06F 3/0362* (2013.01)
*G11B 27/038* (2006.01)
*H04H 60/04* (2008.01)

(52) U.S. Cl.
USPC .................. 362/253; 362/85; 362/551

(58) Field of Classification Search
None
See application file for complete search history.

(56) References Cited

To view the complete listing of prior art documents cited during the proceeding for Reexamination Control Number 90/012,134, please refer to the USPTO's public Patent Application Information Retrieval (PAIR) system under the Display References tab.

*Primary Examiner* — Pia Tibbits

(57) ABSTRACT

A controller or adjustment device may adjust a value of a parameter for different functions. The adjustment device may include actuators, which may be associated with one or more functions. A light source in proximity to the adjustment device may identify the function of the device. Mixers and filters may automatically modify the hue and/or value of the color based on the selected function. A different color light may be used to identify different functions of the adjustment device.

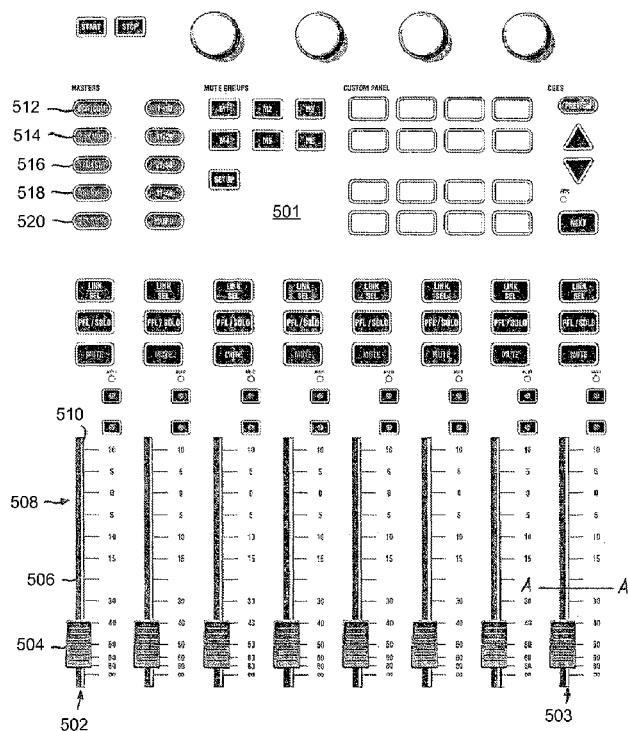

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 2, 3, 13, 15, 16 and 21 is confirmed.

Claims 1, 4, 8 and 18-20 are cancelled.

Claims 5-7, 9, 12, 14, 17 and 22 are determined to be patentable as amended.

Claims 10 and 11, dependent on an amended claim, are determined to be patentable.

New claims 23-76 are added and determined to be patentable.

5. The system of claim [1] *3* where the light source comprises a light emitting diode.

6. The system of claim [1] *3* where the light source is arranged on a printed circuit board.

7. The system of claim [1] *3* where the light source is controlled such that a predetermined color for the light from the light source is associated with the identified function.

9. The slide controller of claim [8] *16* where the illuminating element displays multi-colored light.

12. The slide controller of claim [8] *16* where the illuminating element comprises a luminous strip.

14. The slide controller of claim [8] *16* further comprising: a front plate coupled with the slide controller, where the opening is formed in the front plate.

17. The slide controller of claim [8] *16* where the slide controller is part of an audio mixer and the value that is adjusted is an audio value.

22. The method of claim [19] *21* where a first color is displayed for a first function and a second color is displayed for a second function.

23. *The system of claim 3 wherein the light source includes an illuminating element in or next to the opening.*

24. *The system of claim 23 wherein the light source includes an illuminating element next to the opening.*

25. *The system of claim 24 wherein the light source includes an elongated illuminating element.*

26. *The system of claim 23 wherein the light source includes an elongated illuminating element.*

27. *The system of claim 23 wherein the illuminating element extends parallel to a length of the opening.*

28. *The system of claim 2 wherein:*
*the system includes a plurality of sliders; and*
*the system includes a plurality of light sources in communication with the processor, wherein each of the light sources is associated with one of the plurality of sliders, and displays the light color in an opening of the associated slider.*

29. *The system of claim 28 wherein each light source includes an illuminating element in or next to the opening.*

30. *The system of claim 29 wherein each light source includes an illuminating element next to the opening.*

31. *The system of claim 30 wherein each light source includes an elongated illuminating element.*

32. *The system of claim 29 wherein each light source includes an elongated illuminating element.*

33. *The system of claim 2 including a plurality of sliders, wherein the opening of each slider is elongated and each slider is configured to move along the elongated opening.*

34. *The system of claim 33 and further comprising a plurality of illuminating elements coupled to the light source, each illuminating element disposed in or next to each corresponding elongated opening.*

35. *The system of claim 34 wherein each of the plurality of illuminating elements extends parallel to a length of the corresponding elongated opening.*

36. *The system of claim 34 wherein each illuminating element is configured to display the light color.*

37. *The system of claim 3 wherein the system displays at least a first color to identify a first function and displays at least a second color to identify a second function.*

38. *The slide controller of claim 16 wherein the illuminating element extends next to the opening.*

39. *The slide controller of claim 38 wherein the illuminating element includes a multi-colored light source and the value is identified based on a color of light in the illuminating element.*

40. *The slide controller of claim 38 wherein the value that is adjusted with the slider is selected from the group including volume, treble, bass and fade.*

41. *The slide controller of claim 16 wherein:*
*the controller includes a plurality of the sliders;*
*the controller includes a plurality of the slots in which each of the plurality of sliders may be shifted along through an opening; and*
*the controller includes a plurality of the illuminating elements, wherein each illuminating element extends along one of the plurality of openings, and wherein each illuminating element identifies the value that is adjusted with the associated slider.*

42. *The slide controller of claim 41 wherein each illuminating element extends next to the associated opening.*

43. *The slide controller of claim 42 wherein the illuminating elements are configured to display multi-colored light and the values adjusted by the associated sliders are identified based on a color of light in the illuminating elements.*

44. *The method of claim 21 wherein displaying an identification of a function includes displaying an identification of a function next to the track associated with the slider.*

45. *The method of claim 44 wherein displaying the identification of the function includes displaying light with a color that corresponds with the function.*

46. *The method of claim 45 wherein the light is displayed through the track.*

47. *The method of claim 46 and further including actuating the slider to adjust a value for the function by moving the slider along a linear track.*

48. *The method of claim 18 including associating the function with a plurality of adjusters, wherein each adjuster includes a slider configured to move along a slot.*

49. *The method of claim 48 wherein the identification of the function is displayed adjacent each of the adjusters.*

50. *The method of claim 49 wherein the identification of the function is a color of light associated with the function.*

51. *The method of claim 50 wherein the identification of the function includes associating a first color with a first function and associating a second color with a second function.*

52. The method of claim 21 and further comprising receiving an input from the function selector to change the function associated with the slider from a first function to a second function.

53. A slide controller, comprising:
an audio mixer front plate;
a selector key on the front plate that receives an input;
a processor in communication with the selector key that receives the input and identifies the audio mixer function associated with the input at the selector key;
a plurality of light sources in communication with the processor that identifies the audio mixer function by adjusting the light color from each of the plurality of light sources, wherein the functions are identified based on the color of light from the light sources; and
a plurality of audio mixer adjustment devices on the front plate spaced apart from the selector key, each adjustment device including a slider that moves along a linear track in a slot, wherein each adjustment device is in communication with one of the plurality of light sources and displays the light color in an elongated opening of the adjustment device in the front plate, and wherein each of the plurality of adjustment devices is associated with the function.

54. The slide controller of claim 53 wherein the light sources include illuminating elements next to the openings.

55. The slide controller of claim 54 wherein the light sources include elongated illuminating elements.

56. The slide controller of claim 55 wherein each of the plurality of sliders includes a knob having a width, and wherein a width of each knob extends fully across a width of the corresponding slot in which the slider moves.

57. An audio mixer slide controller, comprising:
an audio mixer front plate;
a plurality of sliders on the front plate, wherein each slider adjusts a value for a function;
a plurality of linear slots in the front plate, wherein each slider may be shifted along through an opening;
a selector key on the front plate at a location spaced apart from the plurality of sliders and configured to allow an operator to select a function that is associated to each of the plurality of sliders; and
a plurality of illuminating elements, wherein each illuminating element extends along one of the plurality of openings, and wherein each illuminating element identifies the value that is adjusted with the associated slider.

58. The audio mixer slide controller of claim 57 wherein each illuminating element extends next to one of the openings.

59. The audio mixer slide controller of claim 58 wherein each illuminating element is an elongated element.

60. The audio mixer slide controller of claim 59 wherein each illuminating element extends generally parallel to one of the openings.

61. The audio mixer slide controller of claim 60 wherein each illuminating element displays multi-colored light and the values are identified based on a color of light in the illuminating elements.

62. The audio mixer slide controller of claim 57 wherein each of the plurality of sliders includes a knob having a width, and wherein a width of each knob extends fully across a width of the corresponding opening.

63. The audio mixer slide controller of claim 57 wherein each illuminating element displays multi-colored light and the values are identified based on a color of light in the illuminating elements.

64. The audio mixer slide controller of claim 63 wherein each illuminating element is an elongated element that extends next to one of the openings.

65. The audio mixer slide controller of claim 64 and further including a processor in communication with the selector key and the illuminating elements, wherein the processor identifies the selected functions and adjusts the colors of light.

66. The audio mixer slide controller of claim 57 and further including a processor in communication with the selector key and the illuminating elements, wherein the processor identifies the selected functions and adjusts the colors of light.

67. A method for identifying a function and adjusting values for the function in an audio mixer, comprising:
operating a function selector at a first location on an audio mixer front panel and receiving a first input from the function selector;
identifying an audio mixer function based on the input from the function selector;
sliding a plurality of adjustors along linear tracks at locations on the front panel spaced apart from the function selector to adjust values for the identified function, wherein the adjustors perform the function by receiving the adjustments;
associating the function with each of the plurality of adjusters; and
displaying an identification of the function on the front panel adjacent each of the plurality of adjusters, wherein displaying the identification includes displaying light with a color that corresponds with the function.

68. The method of claim 67 wherein displaying the identification of the function includes displaying the light next to each of the plurality of adjusters.

69. The method of claim 68 wherein displaying the identification of the function includes displaying light that appears as elongated luminous strips.

70. The method of claim 68 and further including:
operating the function selector at the first location and receiving a second input that is different than the first input; and
sliding a plurality of the adjusters at the locations on the front panel spaced apart from the function selector after receiving the second input.

71. A method for identifying a function and adjusting values for the function in an audio mixer, comprising:
receiving a function input from a function selector disposed at a first location on an audio mixer front panel;
identifying an audio mixer function based on the input from the function selector;
associating the function with each of a plurality of adjusters including a slider that moves along a track and that performs the function by receiving adjustments for the function, each of the plurality of adjusters disposed at locations on the front panel spaced apart from the function selector;
displaying an identification of the function on the front panel adjacent each of the plurality of tracks, wherein displaying the identification includes displaying light having a color that corresponds with the function; and
adjusting a value of the function based on a position of the slider along the track.

72. The method of claim 71 and further comprising receiving a second function input from the function selector identifying a second audio mixer function; and associating the second audio mixer function with each of the plurality of adjusters.

73. The method of claim 71 further comprising displaying an identification of a second function on the front panel adjacent each of the plurality of tracks, wherein displaying the identification of the second function includes displaying light having a second color that corresponds with the second function.

74. The method of claim 71 wherein the function is selected from the group including volume, treble, bass, and fade.

75. The method of claim 71 wherein displaying light includes illuminating a plurality of elements located adjacent the plurality of tracks.

76. The method of claim 75 wherein each of the plurality of elements extends parallel to and along the length of the associated track.

* * * * *